(12) United States Patent
Hoffman et al.

(10) Patent No.: US 9,541,749 B2
(45) Date of Patent: Jan. 10, 2017

(54) SYSTEMS AND METHODS FOR RANDOM INTENSITY ILLUMINATION MICROSCOPY

(71) Applicant: Raytheon BBN Technologies Corp., Cambridge, MA (US)

(72) Inventors: Zachary R. Hoffman, Huntington Station, NY (US); Charles DiMarzio, Cambridge, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 271 days.

(21) Appl. No.: 14/013,808

(22) Filed: Aug. 29, 2013

(65) Prior Publication Data

US 2014/0063281 A1    Mar. 6, 2014

Related U.S. Application Data

(60) Provisional application No. 61/694,965, filed on Aug. 30, 2012, provisional application No. 61/728,255, filed on Nov. 20, 2012.

(51) Int. Cl.
*G02B 21/06* (2006.01)
*G02B 27/48* (2006.01)
*G02B 5/02* (2006.01)

(52) U.S. Cl.
CPC .............. *G02B 21/06* (2013.01); *G02B 27/48* (2013.01); *G02B 5/0278* (2013.01)

(58) Field of Classification Search
CPC ....... G01J 3/10; G01J 3/2823; G02B 21/0064; G02B 12/006; G02B 27/48; G02B 5/0278
See application file for complete search history.

(56) References Cited

U.S. PATENT DOCUMENTS

| | | | |
|---|---|---|---|
| 3,013,467 A | 12/1961 | Minsky | |
| 2003/0223248 A1* | 12/2003 | Cronin | G01J 3/10 362/555 |
| 2005/0141810 A1* | 6/2005 | Vaez-Iravani | G02B 27/48 385/33 |

(Continued)

OTHER PUBLICATIONS

Dwyer, P. J. et al., "Confocal Reflectance Theta Line Scanning Microscope for Imaging Human Skin in Vivo," Optics Letters, vol. 31, No. 7, Apr. 1, 2006.

(Continued)

*Primary Examiner* — Elmer Chao
(74) *Attorney, Agent, or Firm* — Lando & Anastasi, LLP

(57) ABSTRACT

An optical imaging system and method for performing random intensity illumination microscopy is disclosed. The system includes an incoherent signal light source, at least two diffusers having spatially random diffusion patterns, an image capture device that receives a reflected light signal from an object to be imaged, and a processor configured to perform digital image processing of the reflected signal. The method comprises acts of providing an incoherent light signal, diffusing the incoherent light signal with at least two diffusers having spatially random diffusion patterns to provide a diffused light signal, splitting the diffused light signal to provide a first light signal and a second light signal, reflecting the first light signal from a specimen to provide a reflected light signal, collecting the reflected light signal and the second light signal with an image capture device and processing the collected images to determine reflectance.

20 Claims, 18 Drawing Sheets

(56) References Cited

U.S. PATENT DOCUMENTS

| | | | |
|---|---|---|---|
| 2006/0114553 A1* | 6/2006 | Laudo | B01L 9/06 359/368 |
| 2009/0086216 A1* | 4/2009 | Marks | G01N 21/4795 356/511 |
| 2010/0224796 A1 | 9/2010 | Mertz et al. | |
| 2011/0075912 A1* | 3/2011 | Rieber | A61B 19/5225 382/132 |

OTHER PUBLICATIONS

Liu, Jonathan T.C., et. al., "Miniature Near-Infrared Dual-Axes Confocal Microscope Utilizing a Two-Dimensional Microelectromechanical Systems Scanner," Optics Letters, vol. 32, No. 3, Feb. 1, 2007.

Neil, M. A. A., et al., "Method of Obtaining Optical Sectioning by Using Structured Light in a Conventional Microscope," Optics Letters, vol. 22, No. 24, Dec. 15, 1997.

Rajadhyaksha, M. et al., "In Vivo Confocal Scanning Laser Microscopy of Human Skin: Melanin Provides Strong Contrast," The Journal of Investigative Dermatology, vol. 104, No. 6, Jun. 1995.

Shirley, Lyle G. et al., "Speckle from a Cascade of Two Thin Diffusers," J. Opt. Soc. Am. A, vol. 6, No. 6, Jun. 1989.

Ventalon, "Dynamic Speckle Illumination Microscopy with Translated Versus Randomized Speckle Patterns," Optics Express, vol. 14, No. 16, Aug. 7, 2006.

Ventalon, C. et al., "Quasi-Confocal Fluorescence Sectioning with Dynamic Speckle Illumination," Optics Letters, vol. 30, No. 24, Dec. 15, 2005.

Verveer, P.J., et al., "Theory of Confocal Fluoresence Imaging in the Programmable Array Microscope (PAM)," Journal of Microscopy, vol. 189, Pt. 3, Mar. 1988, pp. 192-198.

Warger, W., et al., "Dual-Wedge Scanning Confocal Reflectance Microscope," Optics Letters, vol. 32, No. 15, Aug. 1, 2007.

Wilson, T., et al., "Confocal Microscopy by Aperture Correlation," Optics Letters, vol. 21, No. 23, Dec. 1, 1996.

* cited by examiner

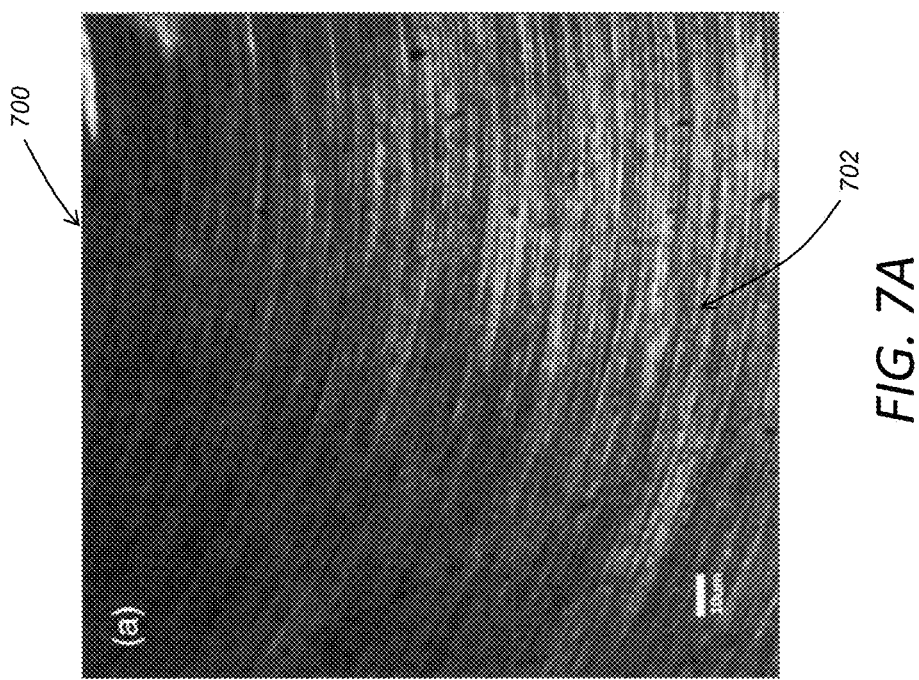

SYSTEMS AND METHODS FOR RANDOM INTENSITY ILLUMINATION MICROSCOPY

BACKGROUND

Wide-field microscopy provides images with short acquisition time and a wide field of view, however its inability to resolve depth information limits it to near-surface measurements or thin samples. In order to provide both lateral and axial information, many techniques in microscopy have been explored. In particular, confocal microscopy has gained popularity for its ability to section individual planes by passing the light through a pinhole and eliminating out of focus light. In particular, confocal reflectance microscopy (CRM) has been used for imaging skin. However, CRM requires the ability to scan individual points on an object leading to expensive and elaborate point scanning equipment. Other techniques for scanning a full 2D plane include the use of dual-wedge scanners or 2D micro-electrical-mechanical scanners.

Apart from microscopy techniques that require lateral scanning, other optical microscopy techniques have been introduced that capture an entire 2D image field in a single step. One such technique is known as structured illumination. This technique uses a known pattern, typically at a constant spatial frequency, projected onto a sample. Reflected light from areas conjugate to the pattern is modulated at that spatial frequency and can be separated from the out of focus regions. This technique requires that the spatial frequency of the pattern is known a-priori, such that an exact ⅓ phase shift can be applied to resolve the entire image. An extension of this technique, known as dynamic speckle illumination (DSI) uses a coherent laser source and a randomly distributed speckle pattern produced by a spatial light modulator that is decorrelated from image to image by either translation or randomization. This technique has been successfully utilized for optical microscopy, however the number of images required to produce sectioning increases with depth, reducing the quality of the sectioning when imaging deeper into the specimen. Also, areas where speckles are correlated can result in streaking within the image, causing undesired artifacts within the final image. Dynamic speckle illumination has also typically been utilized with fluorescence from a specimen as a means of providing depth information about the specimen. The use of fluorescence requires that light be absorbed and re-emitted by the specimen being imaged, which often requires the staining of a specimen with a fluorescent material. Fluorescent stains may suffer from limitations in the potential wavelengths that can be emitted, are subject to photobleaching, and can potentially be harmful to a specimen being imaged in-vivo.

Accordingly, there is a need for optical microscopy systems and techniques that provide for rapid, full-field image acquisition, high quality image sectioning at depth, and safety for in-vivo measurements, all while being very cost effective to produce. Such systems and techniques will increase the range of environments and applications where optical microscopy can be utilized. When applied to biomedical and healthcare applications, such systems and techniques can shorten diagnostic times, reduce invasiveness of imaging procedures, and improve the quality of patient care.

SUMMARY OF INVENTION

Aspects and embodiments are directed to a system and method for optical microscopy that utilizes an incoherent optical light source, and a static speckle diffusion pattern, rotatable about an axis, to image a sample using reflected optical signals.

One embodiment of an optical imaging system comprises: an incoherent light source configured to provide an incoherent light signal; at least two diffusers coupled to the incoherent light signal and configured to provide a diffused light signal having spatially random diffusion patterns; a beam splitter coupled to the diffused light signal and configured to provide a first light signal and a second light signal; an objective lens coupled to the first light signal and configured to focus the first signal on a sample object to be imaged to provide a reflected signal; an image capture device, coupled to the beam splitter so as to receive the first light signal and the reflected light signal; and a processor coupled to the image capture device and configured to perform digital image processing.

Another embodiment of an optical imaging system comprises: an incoherent light source that can be configured to provide an incoherent light signal; at least one diffuser coupled to the incoherent light signal and can be configured to provide a diffused light signal having a spatially random static diffusion pattern; a beam splitter coupled to the diffused light signal and configured to provide a first split signal and a second split signal; an objective lens coupled to the first split signal and that can be configured to focus the first signal on an object to be imaged; and an image capture device coupled to the beam splitter.

Another embodiment of an optical imaging system comprises an incoherent signal light source that provides an incoherent signal, at least two diffusers that provide a diffused light signal having spatially random diffusion patterns, a beam splitter that provides a first light signal and a second light signal, an objective lens that focuses the first light signal on an object to be imaged to provide a reflected signal, an image capture device that receives the second light signal and the reflected signal, and a processor configured to perform digital image processing of the imaged reflected light signa and the second signal to determine reflectance of the from the object.

Another embodiment of an optical imaging system comprises an incoherent light source, at least one diffuser of a plurality of diffusers having a spatially random static diffusion pattern, a beam splitter, an objective lens, and an image capture device.

According to aspects of various embodiments, the incoherent light source can be a light emitting diode.

According to aspects of various embodiments, the at least two diffusers can also be configured to be rotatable about an axis parallel to the optical axis of the system.

According to aspects of various embodiments, the at least two diffusers can have a spatially random diffusion pattern that comprises a static diffusion pattern with at least two distinct spatial frequencies.

According to aspects of various embodiments, the at least two diffusers may comprise a plurality of diffusers that can maintain a fixed mutual orientation when rotated azimuthally about an axis.

According to aspects of various embodiments, the at least two diffusers may comprise a plurality of diffusers wherein at least one diffuser is independently rotatable.

According to aspects of various embodiments, the system may further comprise at least one motor configured to rotate at least two diffusers.

According to aspects of various embodiments, the at least two diffusers may comprise ground glass having a random pattern to provide the at least two diffusers.

According to aspects of various embodiments, the at least two diffusers can comprise a single device that has a random pattern to provide the at least two diffusers.

According to aspects of various embodiments, the image capture device can be a detector capable of capturing digital images.

According to aspects of various embodiments, the image capture device can comprise a charged coupled device array capable of capturing digital images.

According to aspects of various embodiments, the image capture device can comprise a complementary metal oxide semiconductor device array capable of capturing digital images.

According to aspects of various embodiments, the system can be configured to capture a first image of the first signal reflected from the object.

According to aspects of various embodiments, the optical imaging system can be further configured to rotate the diffuser about an axis and to capture a second image of the second light signal with the image capture device.

According to aspects of various embodiments, the system can be further configured to rotate the static, spatially random diffuser in such a manner that the second image is de-correlated from the first image.

According to aspects of various embodiments, the system can be further configured to determine with the processor a contrast in irradiance of the first image and the second image.

According to aspects of various embodiments, the system can be further configured to determine with the image capture device and the processor an amount of reflected light by the object from the first image and the second image.

According to various embodiments, the system can further comprise a motor configured to move the object along the optical axis of the imaging system.

According to various embodiments, the system can further comprise a motor configured to move the objective lens along the optical axis of the imaging system.

According to various embodiments, the optical imaging system can further comprise a first focusing lens located between the incoherent light source and the diffuser that can be configured to focus the incoherent light signal on the diffuser at a focal plane of the first focusing lens.

According to various embodiments, the optical imaging system can further comprise a first imaging subsystem that can be configured to image the diffused signal onto the sample object.

According to various embodiments, the optical imaging system can further comprise a second imaging subsystem that can be configured to image the reflected signal from the sample object onto the image capture device.

According to aspects of various embodiments, the first imaging subsystem can comprise a collimating lens coupled to the diffuser and configured to collimate the diffused light signal in the direction of the sample object, and the objective lens coupled to the collimating lens and configured to focus the first split signal on the sample object.

According to aspects of various embodiments, the second imaging subsystem can comprise the objective lens that can be configured to collimate the reflected light signal reflected from the sample object, the beam splitter coupled to the objective lens can be configured to redirect the reflected light signal in the direction of the image capture device, and a second focusing lens coupled to the beam splitter that can be configured to focus the first light signal and the reflected light signal on the image capture device.

One embodiment of a method of optical imaging a specimen with an imaging system comprises: providing an incoherent light signal with an incoherent light source; diffusing the incoherent light signal with at least two diffusers having spatially random diffusion patterns to provide a diffused light signal; splitting the diffused light signal with a beam splitter to provide a first light signal and a second light signal; reflecting the first light signal from a specimen to provide a reflected light signal; reflecting from the beam splitter the reflected light signal; and collecting the reflected light signal with an image capture device and providing a first image.

Another embodiment of a method of optical imaging a specimen with an imaging system comprises: providing an incoherent light signal with an incoherent light source; diffusing the incoherent light signal with at least one diffuser having a spatially random, static diffusion pattern to provide a diffused light signal; splitting the diffused light signal with a beam splitter to provide a first light signal and a second light signal; reflecting the first light signal from a specimen to provide a reflected light signal; reflecting from the beam splitter the reflected light signal; collecting the reflected light signal with an image capture device; and providing a first image.

Another embodiment of a method of optical imaging a specimen comprises acts of providing an incoherent light signal, diffusing the incoherent light signal with at least two diffusers having spatially random diffusion patterns to provide a diffused light signal, splitting the diffused light signal to provide a first light signal and a second light signal, reflecting the first light signal from a specimen to provide a reflected light signal, collecting the reflected light signal and the second light signal with an image capture device to provide a first image and a second image.

Another embodiment of a method of optical imaging a specimen comprises acts of generating illumination with an incoherent light source, diffusing the illumination with at least one diffuser of a plurality of diffusers having a spatially random, static diffusion pattern, reflecting the illumination from a specimen, and collecting the illumination reflected from the beam splitter with an image capture device for producing a first image.

According to aspects of various embodiments, the method may further comprise producing with a processor a first digital image from the first image collected by the image capture device.

According to aspects of various embodiments, the method can further comprise providing the at least two diffusers with a static, spatially random diffusion pattern.

According to aspects of various embodiments, the method can further comprise rotating the at least two diffusers about an axis.

According to aspects of various embodiments, the method can further comprise collecting the second light signal with the image capture device and producing a second image.

According to aspects of various embodiments, the method can further comprise producing with the processor a second digital image from the second image collected by the image capture device after rotating at least one diffuser.

According to aspects of various embodiments, the act of rotating at least two diffusers can comprise rotating the static, spatially random diffusion pattern in such a manner that the second image is de-correlated from the first image.

According to aspects of various embodiments, the method may further comprise calculating with the processor a contrast in irradiance of the first image with irradiance of the second image.

According to aspects of various embodiments, the method may further comprise determining with the processor an amount of reflected light by the object from the first image and the second image.

According to aspects of various embodiments, the method can further comprise moving the object along the optical axis of the imaging system between capture of the first and second images.

According to aspects of various embodiments, the method can further comprise moving the objective lens along the optical axis of the imaging system between capture of the first and second images.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 7A is an example image with streaking produced by a random intensity illumination imaging process;

DETAILED DESCRIPTION

Figure 1A:
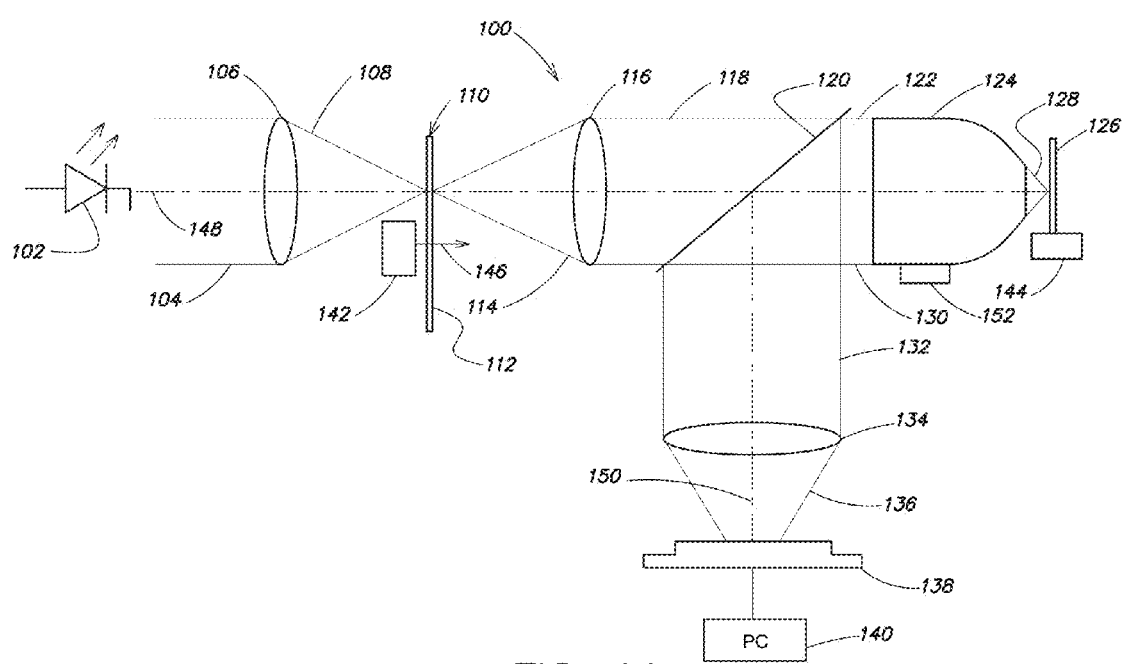
FIG. 1A is a diagram of an optical imaging system for use in random intensity illumination.

Some of the aspects and embodiments disclosed herein are directed to apparatus and processes for optical microscopy utilizing the techniques of random intensity illumination (RII) and cascaded random intensity illumination (CRII), which are terms coined by the applicants of this disclosure. RII is an improvement and modification of the techniques utilized in dynamic speckle illumination (DSI). RII utilizes a random or pseudorandom diffusion pattern when illuminating an object, RII makes use of inexpensive, incoherent light emitting diode (LED) sources, and RII can adequately image a specimen using only light signals that have been reflected from a specimen. Unlike prior structured illumination methodologies, RII does not require the use of fluorescence, which makes this technique a suitable candidate for imaging human skin in-vivo as an alternative to biopsy. The use of an LED source not only reduces cost and manufacturing complexity, but eliminates the speckles associated with the use of lasers found in competitive microscopy techniques. Also, since the system does not require a specific spatial frequency of modulation pattern, the exact layout of the random or pseudorandom diffusion pattern can be and is completely arbitrary. Consequently, low cost components can be utilized for the diffusers of the RII system. CRII is an extension of RII in which two or more random or pseudorandom diffusion patterns are cascaded in series when illuminating the specimen. These multiple diffusion patterns include both high and low spatial frequency speckle patterns that provide for imaging multiple light intensities and allow for enhanced sectioning capabilities.

As discussed in more detail below, these techniques for randomized reflectance speckle illumination provide a novel method and apparatus of optical microscopy that uses inexpensive components, provides high image quality, and are non-invasive for in-vivo imaging applications. The herein described imaging methodology and apparatus utilize an incoherent light source and a set of random diffusion patterns, are robust to manufacturing and alignment variations that may arise from the assembly of imaging system components, as well as being more robust to variations in operational environments than previous techniques used for optical microscopy.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 1B:
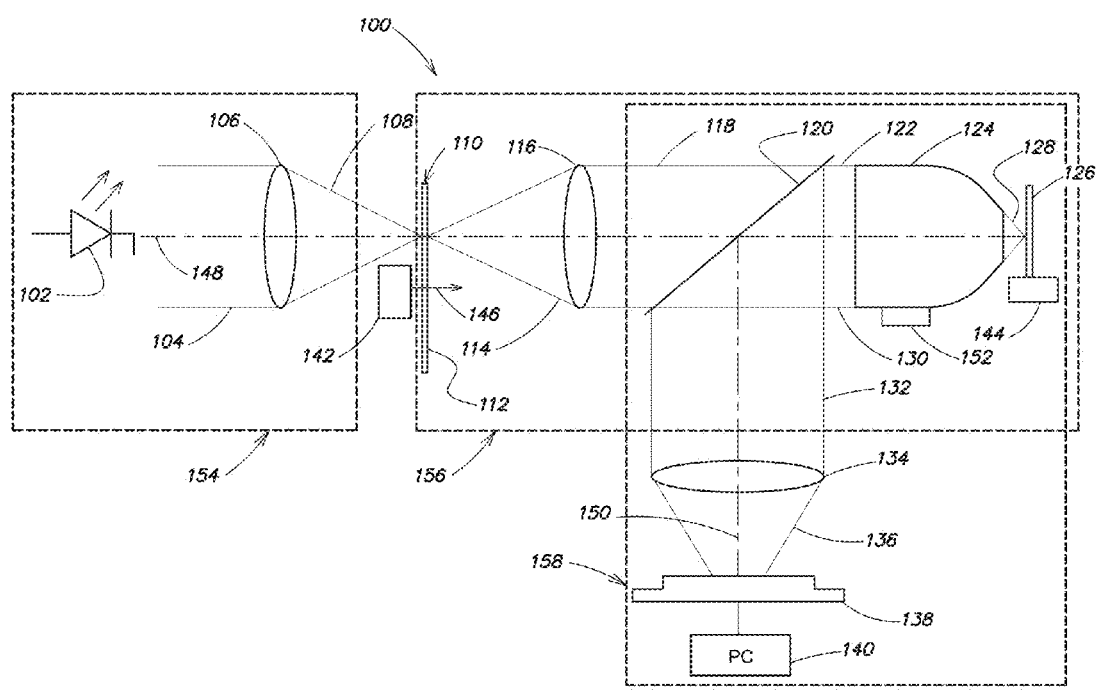
FIG. 1B is another diagram of an optical imaging system for use in random intensity illumination highlighting the imaging subsystems.

Some embodiments disclosed herein implement an optical microscopy apparatus utilizing an incoherent light source and a set of one or more spatially random diffusers to image a sample object using only light that has been reflected from that sample object. FIG. 1A illustrates one embodiment of an optical microscopy system 100 containing multiple optical elements aligned along axis 148 and primary optical axis 150 and comprised of three primary subsections, 154, 156, and 158 as shown in FIG. 1B. In some embodiments, the system can include an LED source 102 capable of emitting an incoherent and relatively broadband incoherent optical signal 104 in the direction of a focusing lens 106. The focusing lens 106 can focus the focused incoherent optical signal 108 on a spatially random or pseudorandom diffuser 110. The LED 102, incoherent optical signal 104 and focusing lens 106 comprise the first primary subsection 154 of the optical microscopy system 100. In some embodiments the spatially random or pseudorandom diffuser 110 can be comprised of ground glass. In further embodiments, the diffuser 110 can be mounted such that it is rotatable about axis 148 that is parallel to the primary optical axis 150 of the imaging system. In some embodiments, once the focused incoherent optical signal 108 propagates through the diffuser 110, the spatially random or pseudorandom pattern 112 provided by the diffuser can be impressed upon the focused incoherent optical signal 108.

In various embodiments, once the focused incoherent optical signal 108 propagates through the diffuser 110, the now diverging optical signal 114 carrying the random or pseudorandom modulation provided by the diffuser 110 can propagate from the diffuser 110 to a collimating lens 116 where the signal can be collimated. The now collimated optical signal 118 propagates through a beam splitter 120 to provide a first split signal 122 to a microscope objective lens 124. In some embodiments, the beam splitter 120 can comprise two triangular glass prisms joined with an adhesive. In other embodiments, the beam splitter 120 can be comprised of a half-silvered mirror or a dichroic mirrored prism. Upon reaching the microscope objective lens 124, the first split signal 122 can be focused by the microscope objective lens 124 on to a sample object specimen 126. The second primary subsection 156 of the optical microscopy system 100 may be comprised of the diffuser 110, the collimating lens 116, the objective lens 124, and the sample object specimen 126.

The reflected optical signal 128 reflected from the sample object specimen 126 can propagate back through the microscope objective lens 124 and can be collimated by the objective lens 124 to provide signal 130 that travels towards the beam splitter 120. Upon arriving at the beam splitter 120, a portion of the signal 130 can be redirected perpendicularly. The redirected optical signal 132 can propagate toward a second focusing lens 134. In various embodiments, the second focusing lens 134 can focus the optical signal 136 on to an image capture device 138 coupled to a computer processor 140 capable of processing digital images. The optical signal 136 reaching the image capture device 138 can be comprised of incoherent radiation on which can be superimposed both the random, or pseudorandom, speckle pattern of the diffuser 110 as well as an image of the sample object specimen 126. In some embodiments the image capture device 138 can be a charge coupled device (CCD) array. In other embodiments, the image capture device 138 can be a complementary metal oxide semiconductor (CMOS) device array. In further embodiments, the image capture device 138 can be any electronic or photonic device capable of capturing digital images as well as either communicating that digital image information to a processor, such as the computer processor 140, or writing the digital image information to a non-volatile computer readable storage medium.

In some embodiments, the image capture device 138 is capable of collecting an optical signal based on the irradiance of light impinging on its surface. For the DRSI optical microscopy system 100, a model describing the irradiance on the detector can be described as in the following equation:

$$I_d(\vec{\rho}_d) = \iiint \text{PSF}_{det}(\vec{\rho}_d - \vec{\rho}, -z)\tau_i(\vec{\rho}, z)I_s(\vec{\rho}, z)d\vec{\rho}^2 dz \quad (1)$$

where $I_s$ is the pattern irradiance, $\tau_i$ is the reflectance of the object, and $\text{PSF}_{det}$ is the point spread function of the optical detection path. In performing the RII imaging process, the goal is to maximize the change in $I_d$ to ensure that there is a strong fluctuation as the speckle pattern varies. In some embodiments, to create this change in $I_d$, multiple image frames can be captured by the image capture device 138, and between each frame capture event the spatially random or pseudorandom pattern 112 can be altered in such a manner that there is a random change in the imposed irradiance.

In an ideal setting, the diffusion pattern imposed by the diffuser would be perfectly random from frame to frame. In a preferred embodiment of the present system, a pseudorandom change in the imposed irradiance can be created through a rotation of the diffuser 110 about an axis 148 that can be parallel to the primary optical axis 150. By sufficiently rotating the diffuser 110, all parts of the imposed diffusion pattern can be moved across the image plane at the specimen. A sufficient radial translation of the diffusion pattern ensures that no point in the imposed diffusion pattern is in the same location from frame to frame. In these embodiments, a motor 142, such as a servomotor, can be used to perform a precisely controlled rotation of the diffuser 110.

When using a rotation of the diffusion pattern in the described manner, the illumination pattern may still be radially correlated from frame to frame. These radial correlations of the RII technique can be improved upon through the use of diffusers incorporating multiple spatial frequencies, as described below in regards to the CRII technique.

In some embodiments, at a particular imaging depth of the specimen, multiple image frames, which on average could be about 40 frames, can be captured to produce an image. Upon the capture of multiple frames, a composite irradiance $I_r$ can be calculated as the root mean square (RMS) difference of frame irradiance values as follows:

$$I_r = E_n \sqrt[N]{(I_n - I_{n+t})^2} \qquad (2)$$

where t is the interval between images, during which the focused incoherent optical signal 108 has been rotated by some distance. In some embodiments, those areas where the contrast has changed, due to the imposed diffusion pattern, can result in large values of $I_r$. Those areas not in focus can have a blurred speckle pattern leading to a low value in $I_r$. In some embodiments, rather than using consecutive image frames, where t=1, decorrelation of the diffusion speckle pattern can be maximized by selecting a rotation t, where the speckles have low correlation from frame to frame.

The correlation can be computed as a function of the diffuser 110 rotation speed and the acquisition speed of the image capture device 138, and can be represented by the following formula:

$$C_i = \frac{\overline{I_s(\vec{\rho})I_s(\vec{\rho}+\Delta\vec{\rho})} - \overline{I_s(\vec{\rho})}^2}{\overline{I_s(\vec{\rho})^2} - \overline{I_s(\vec{\rho})}^2} \qquad (3)$$

wherein the correlation is computed between two frames having the projected pattern adjusted by a value of $\Delta\vec{\rho}$. In some embodiments, the amount of background rejection in $I_r$ can be maximized by selecting a rotation step t that yields the highest average decorrelation from frame to frame. If two frames were perfectly decorrelated, then the contrast when calculating he RMS difference would be maximized and a minimum number of image frames would be required. In practice, there is often a tradeoff when setting the rotation speed, where large translations increase the imposed diffusion pattern decorrelation and image quality resulting from a decrease contrast due to motion blurring. As an example, an optimization for one configuration might conclude that selecting a value of t>5 returns a result that is better than t=1. For this example embodiment, if each rotation step for consecutive frames is approximately 3°, then a value of t=5 results in an approximately 15° rotation of the diffuser 110 about axis 148 by the motor 142.

In some embodiments imaging the sample object specimen 126 at separate depths within the sample object specimen 126 can be accomplished by translation of the microscope objective lens 124 using a motor 152. In other embodiments, imaging the sample object specimen 126 at separate depths can be accomplished by translation of the sample object specimen 126 itself using a motor 144.

As depth increases for an object to be imaged by a RII imaging process and apparatus, illumination contrast for the spatially random or pseudorandom pattern 112 can be lost. According to some embodiments, this loss of illumination contrast can be overcome by capturing additional image frames to make up for the loss in signal strength. However, capturing additional image frames increases the overall time necessary to complete the imaging process. Accordingly, according to aspect of some embodiments, where it is desirable to provide a rapid imaging process, there is provided a method and apparatus of maintaining this image contrast that leads to fewer required image frames per composite image and to a shortened total image capture process time.

Figure 2:
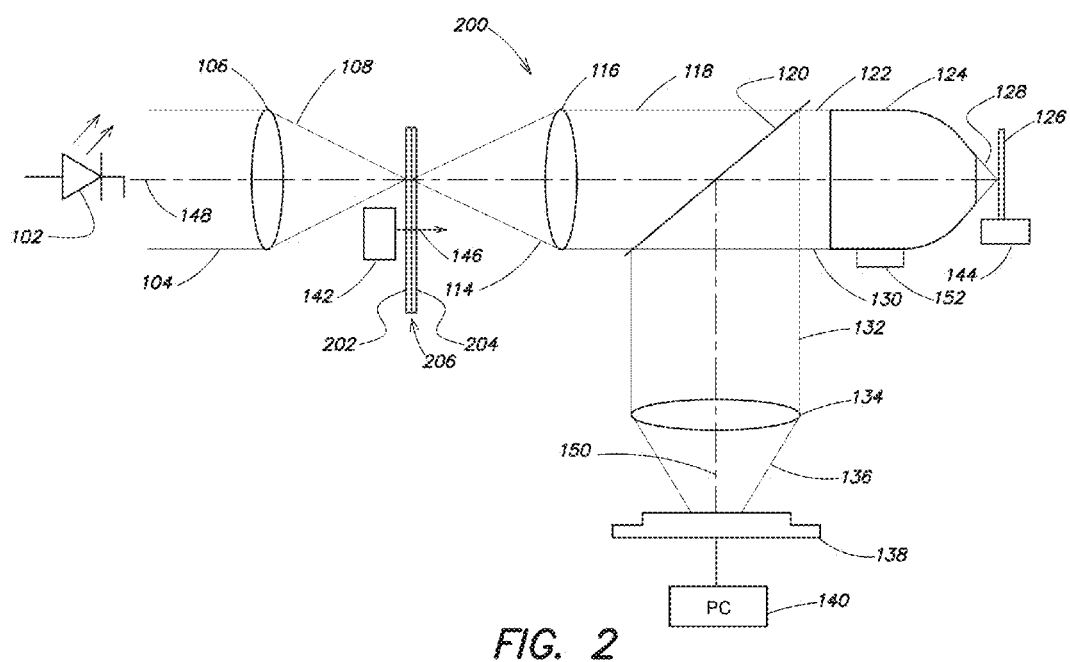
FIG. 2 is a diagram of an optical imaging system for use in cascaded random intensity illumination.

FIG. 2 illustrates an example of a CRII optical microscopy system 200 in which a composite diffuser 206 including multiple random or pseudorandom diffusers 202 and 204 having distinct spatial frequency compositions. Elements with like reference numbers to FIG. 1 are the same as the elements of FIG. 1 and for the sake of brevity are not discussed again with respect to FIG. 2. Compared to the RII optical microscopy system 100 of FIG. 1, the CRII optical microscopy system 200 of FIG. 2 differs primarily in that the composite diffuser replaces diffuser 110. In the embodiment shown in FIG. 2, a first spatially random or pseudorandom diffuser 202 having a first set of primary spatial frequency content is adjacent to a second spatially random or pseudorandom diffuser 204 having a distinct second set of primary spatial frequency content. In some embodiments, as in the embodiment of optical microscopy system 200, diffusers 202 and 204 are rotatable about an axis 146 that can be parallel to axis 148. Rotation of the diffusers can be driven by motor 142. In a preferred embodiment, at least one of the diffusers 202 and 204 is comprised of ground glass. In further embodiments, both diffusers 202 and 204 can be different elements each comprised of ground glass manufactured with distinct primary spatial frequency patterns. In some embodiments, at least one of the diffusers 202 and 204 can be comprised of a spatially random or pseudorandom material such as a diffusion paper or a pressure sensitive tape, such as Scotch® tape from 3M Corporation of Maplewood, Minn. In some embodiments, the diffusers 202 and 204 can be discrete elements that are physically separated. In other embodiments, the diffusers 202 and 204 can be integrated elements that are physically connected. In further embodiments, the diffusers 202 and 204 can be manufactured as a single element where at least two distinct random or pseudorandom patterns of separate primary spatial frequency content can be combined in the production of a single element. In various embodiments, the number of distinct diffusers or patterns of separate primary spatially frequency components in an integrated diffuser can be greater than two and no numerical limit on the number of distinct diffusers or patterns with distinct primary spatial frequency components are implied or defined.

Figure 3A:
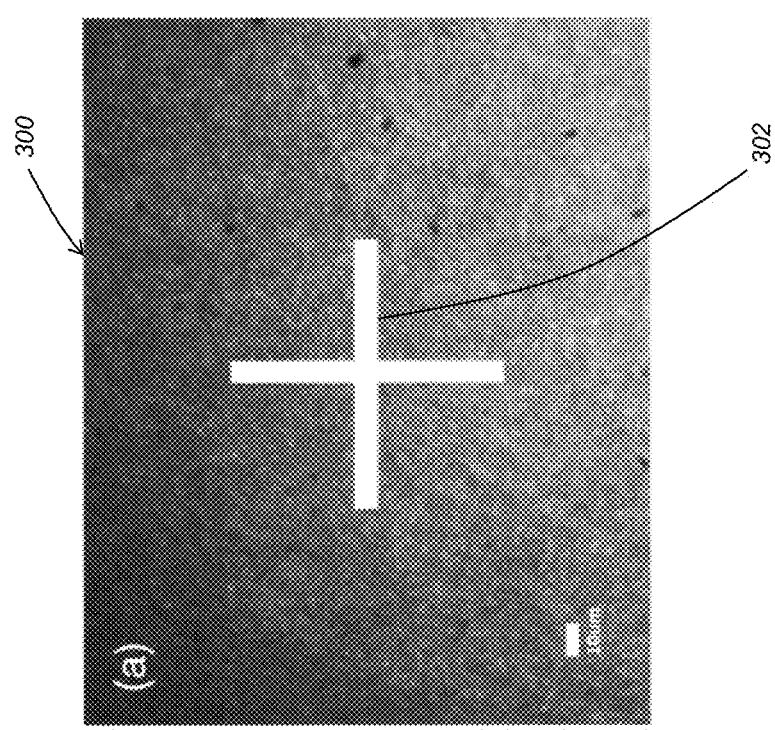
FIG. 3A is an example image frame produced using a random intensity illumination pattern technique.
Figure 3B:
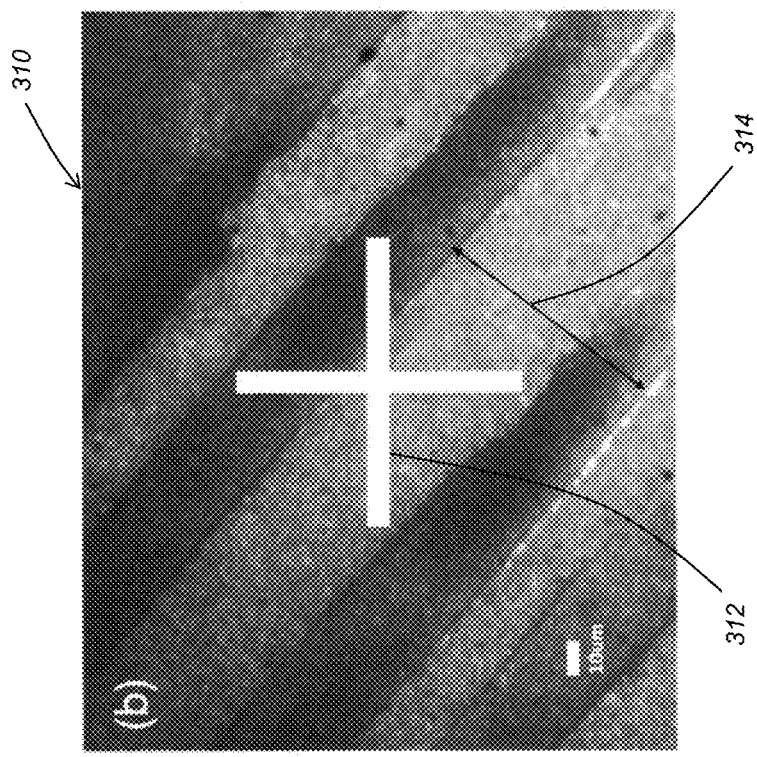
FIG. 3B is an example image frame produced using a cascaded random intensity illumination pattern technique.

FIG. 3A shows an example illumination pattern 300 projected on a mirror and captured as a digital image frame using a RII apparatus and method with a single random or pseudorandom diffusion pattern. The crosshair 302 represents an example of vertical and horizontal stripes of 500 pixels over which the irradiance, contrast, and diffusion pattern correlation of the illumination can be measured using a RII apparatus and method, as described previously. In various embodiments, the number, shape and arrangement of pixels used for measuring various figures of merit of a sample object specimen can be chosen to meet the needs of the particular application. In some embodiments, a rectangular, circular, elliptical, or other distribution of pixels might be chosen as the set of pixels used in calculating various figures of merit. FIG. 3B shows an example illumination pattern 310 projected on a mirror and captured as a digital image frame using a CRII apparatus and method with a broadband diffusion pattern comprising multiple distinct spatial frequencies. Similar to the crosshair 302 shown in FIG. 3A, the crosshair 312 represents an example pixel set of vertical and horizontal striped regions over which sampling occurs for various figure of merit calculations. The broadband diffusion pattern provided from multiple diffusers, such as diffusers 202 and 204, used in producing image 310 can impose a low spatial frequency signal 314 on the image 310 in addition to the diffusion pattern. The image can essentially be described as the image of the two diffusion patterns with a low frequency modulation superimposed. The presence of a low spatial frequency signal provides the capability for maintaining strong image contrast with increasing image depth.

Figure 4A:
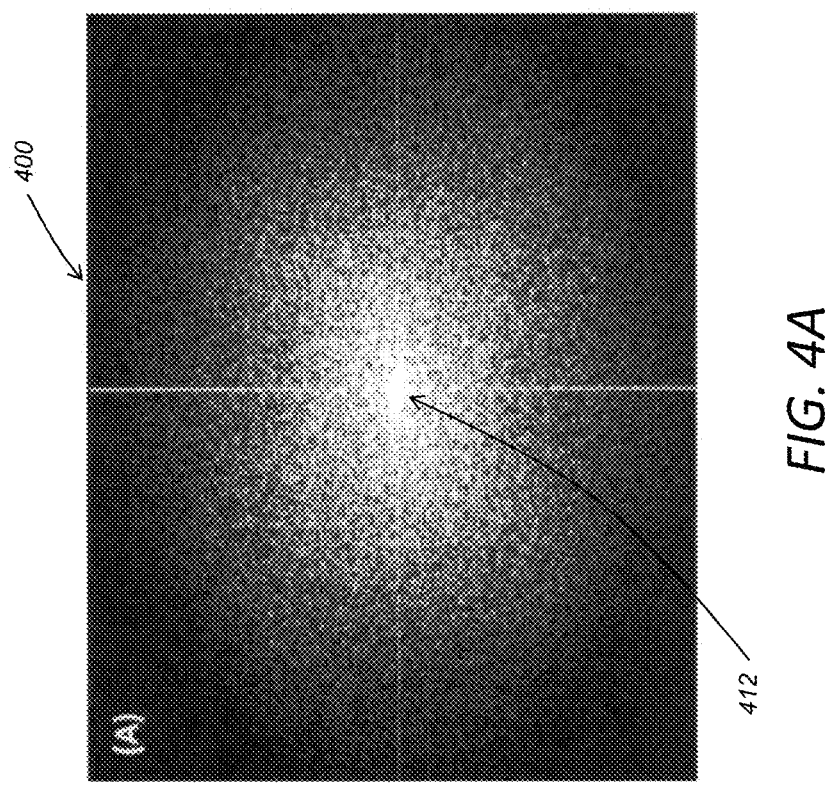
FIG. 4A is an example image frame of the 2D Fast Fourier Transform of a single spatial frequency pattern used in a random intensity illumination pattern technique.
Figure 4B:
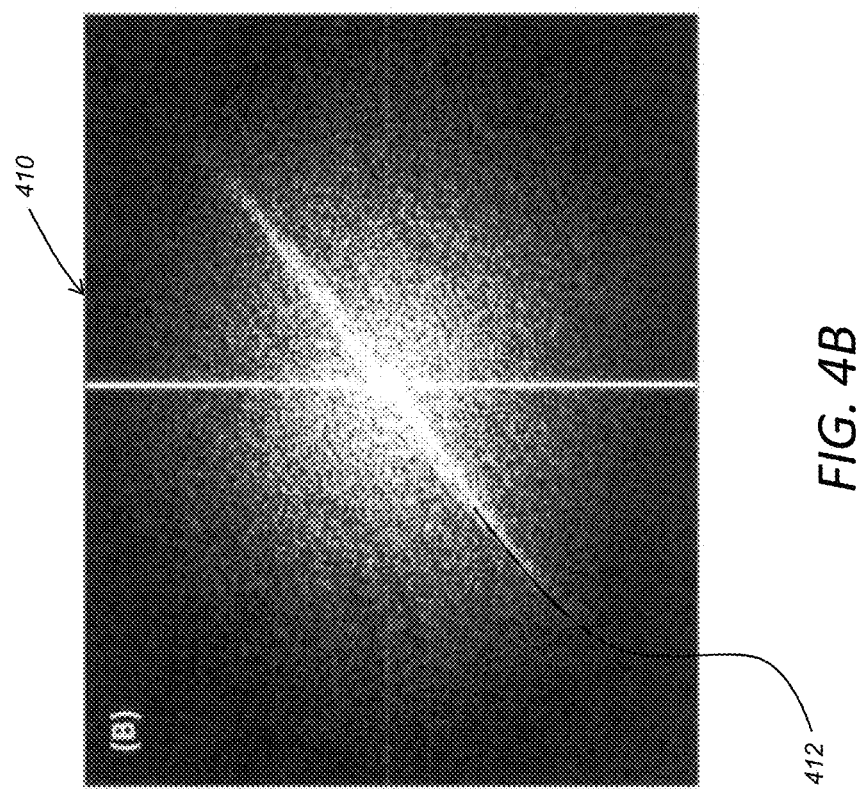
FIG. 4B is an example image frame of the 2D Fast Fourier Transform of multiple spatial frequency patterns used in a cascaded random intensity illumination pattern technique.

FIG. 4A shows an image 400 of a two-dimensional Fast Fourier Transform of a single speckle pattern used in a RII optical microscopy apparatus, such as system 100. The distribution of frequency components is essentially radially uniform. In contrast, FIG. 4B shows an image 410 of a two-dimensional Fast Fourier Transform of a broadband speckle pattern used in a CRII optical microscopy apparatus, such as system 200. The distribution of frequency components within image 410 includes the pattern from multiple diffusers and has additional power 412 along the axis of modulation.

When an illumination pattern is projected onto a specimen, it is expected that the highest frequencies can be imaged with the least blurring at the surface of the object and can decay in contrast as function of depth. According to some embodiments, this loss at depth at higher frequencies can be overcome with additional images measured in order to section a specimen further under the surface. In various embodiments, CRII overcomes this issue by leveraging a lower spatial frequency which does not attenuate as quickly at depth. By using a lower spatial frequency to provide imaging capability at depth, there can be a trade-off between that depth capability and a loss in axial resolution that accompanies the use of a lower spatial frequency.

Figure 5A:
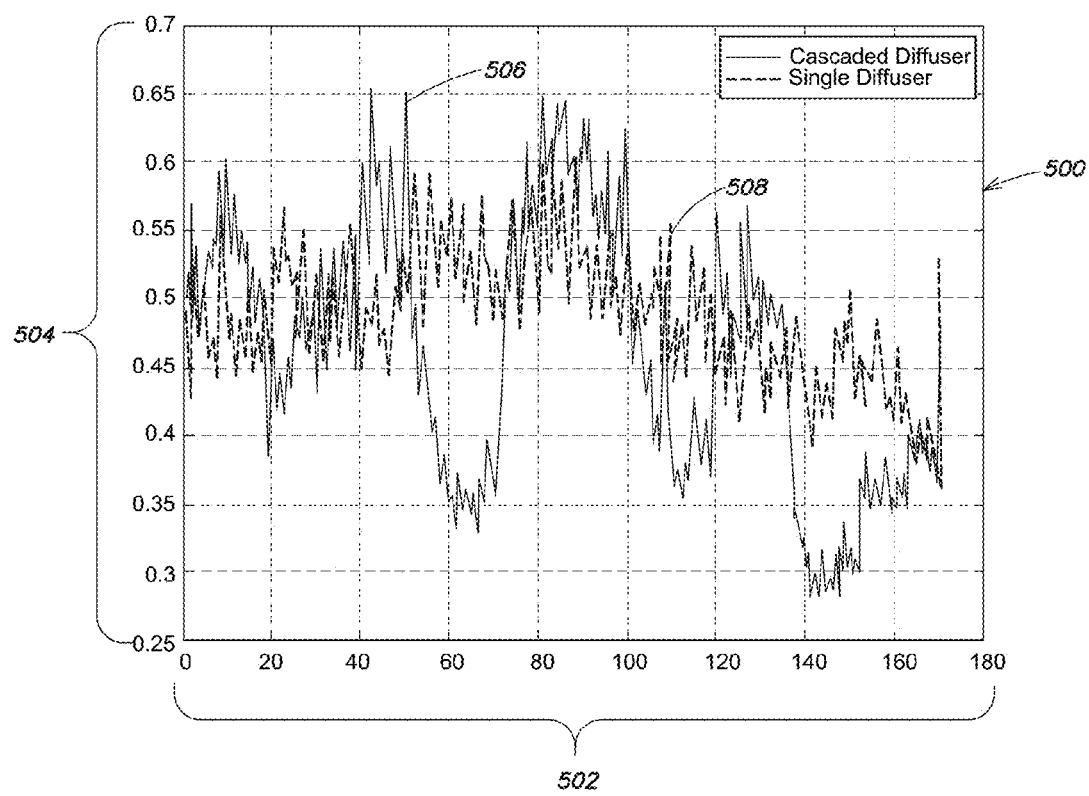
FIG. 5A is a cross section plot of normalized irradiance amplitude measurements at the surface of a specimen.
Figure 5B:
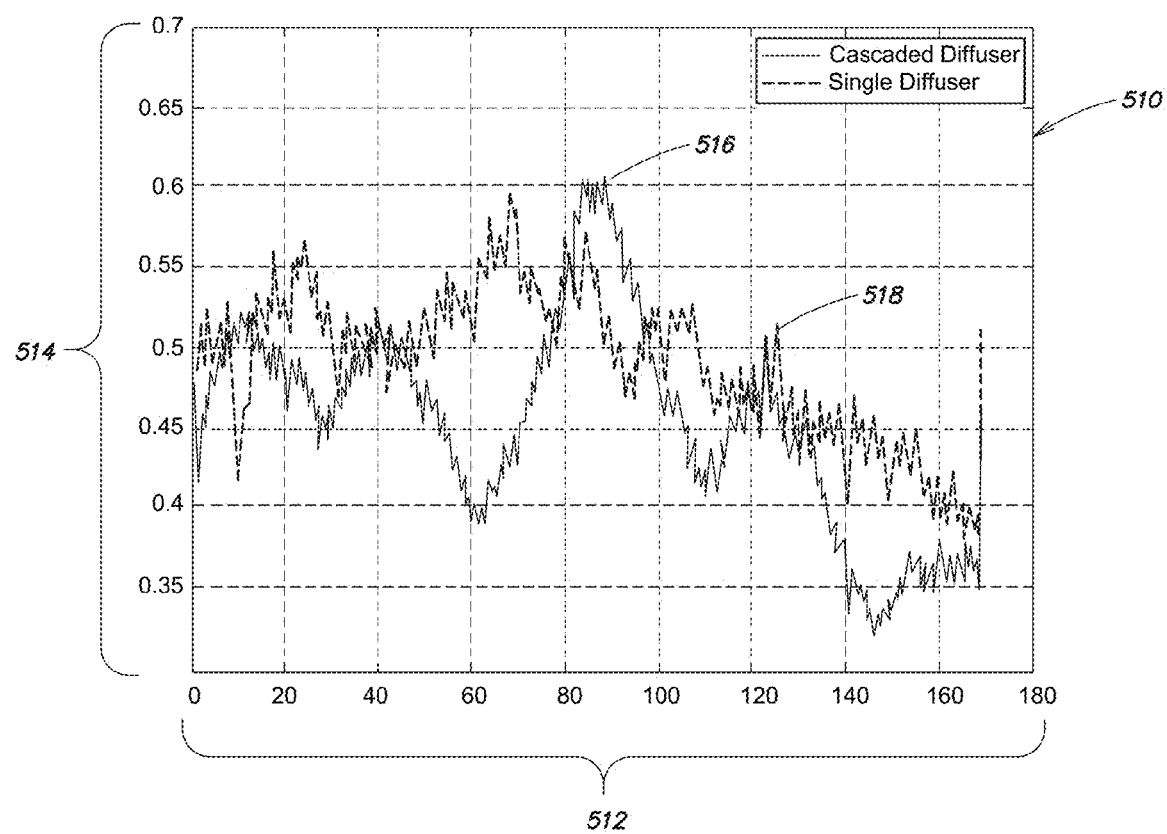
FIG. 5B is a cross section plot of normalized irradiance amplitude measurements below the surface of a specimen.
Figure 5C:
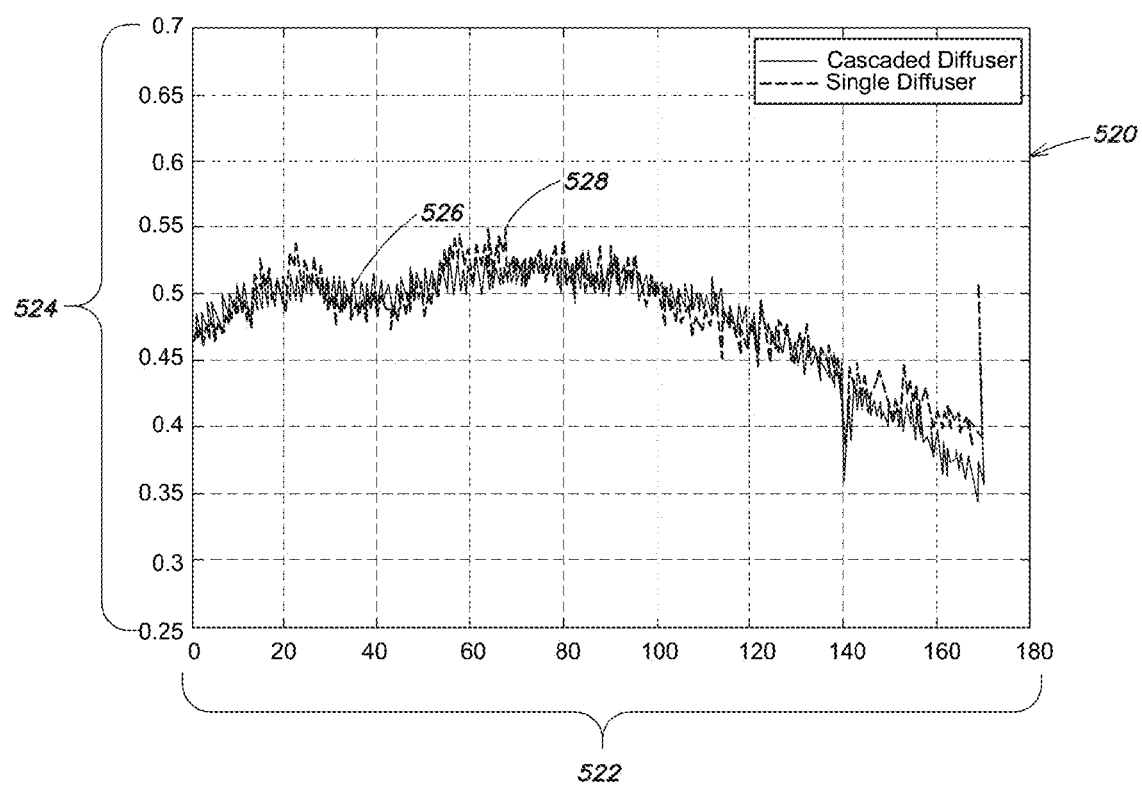
FIG. 5C is another cross section plot of normalized irradiance amplitude measurements below the surface of a specimen.

To illustrate the loss of resolution as a function of depth measurement, FIG. 5A-FIG. 5C are plots of the resolutions (normalized amplitude) for images of particular speckle patterns projected onto a mirror and captured using the RII and CRII techniques measured at separate depth values for each Figure. FIG. 5A shows a graph 500 depicting spatial distance across the image plane in micrometers 502 plotted versus normalized amplitude 504 at the surface, a depth of 0 micrometers. Graph 500 includes measurements for both the CRII broadband speckle 506 and single speckle 508 measured as a one-dimensional cross-section. FIG. 5B shows a similar graph 510 measuring one-dimensional cross-sections of spatial distance across the image plane in micrometers 512 versus normalized amplitude 514 for broadband speckle 516 and single speckle 518 at a depth of 0.5 micrometers. Similarly, FIG. 5C shows a graph 520 plotting one-dimensional cross-sections for broadband speckle 526 and single speckle 528 as functions of spatial distance across the image plane in micrometers 522 and normalized amplitude 524 at a depth of 1.0 micrometer. In each of these graphs 500, 510, and 520, the imaged speckle pattern was configured to be perfectly conjugate to the image capture device at each of the measured depths. By comparing each of the graphs, it can be seen that a significant loss in modulated signal strength can occur as the pattern goes out of focus. In FIG. 5A, graph 500 shows that both patterns contain a strong high frequency component throughout the entire signal. In FIG. 5B, graph 510 shows that the pattern is far enough out of focus that the high frequency pattern is completely lost. However, curve 516 representing the CRII measurement shows that the low frequency modulation is still present and can contribute to the resulting image. In FIG. 5C, graph 520 shows that both patterns have been lost, leaving only slight contrast changes due to the field of view of the light source.

Figure 6:
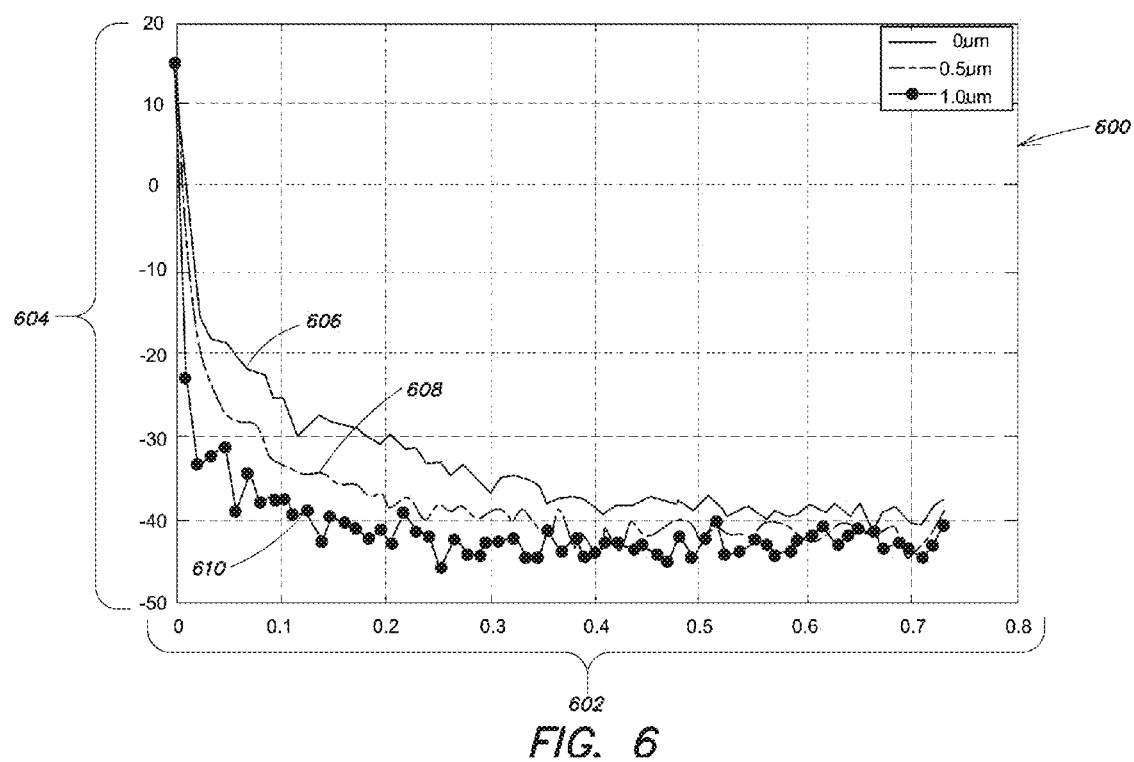
FIG. 6 is an example plot of the power spectral density of a signal measured at various depths for a cascaded random intensity illumination imaging process.

As a further example of quantification of potential signal loss in the optical microscopy systems described herein, FIG. 6 shows measurement of the power spectral density at various depths. Graph 600 shows plots of power spectral density in dB versus frequency of cycles per pixel 602 at various depths of 0 micrometers (surface measurement), 0.5 micrometers, and 1.0 micrometers in curves 606, 608 and 610 respectively. The highest value of the signal is at a depth of 0 micrometers across all frequencies. As the depth is increased from 0 to 0.5 micrometers, there was a loss in the high frequency information, greater than 0.04 cycles per pixel, of nearly 15 dB, whereas lower frequencies decreased with a 5 dB loss. At 1.0 micrometer, the entire spectrum decays by about 15 dB. These measurements show that the sectioning process reduces signals outside of 1.0 micrometer of focus by about 15 dB or that the axial resolution of the system is about 1.0 micrometer for any plane in focus. The sectioning ability of the system is comparable to confocal systems attempting to achieve in-vivo images using reflectance only.

In some embodiments, verification that CRII produces an increased contrast versus DRSI can be performed by characterizing the standard deviation of $I_d$ from frame to frame in the image capture process. In various embodiments, example methods of verification can include taking a measurement of the irradiance at a single pixel from frame to frame and then determining the standard deviation of $I_d$ over all frames. In other embodiments, a one dimensional cross-section of pixels can be measured at each frame with the standard deviation at each pixel location determined and an average of the standard deviation for all pixels calculated. Tables 1 shows example results from these standard deviation calculations for a particular experiment where measurements were taken for a single pixel, a vertical stripe of 500 pixels and a horizontal stripe of 500 pixels over 40 image frames. In this particular experiment, a ground glass diffuser was separated into two parts with an additional diffusion pattern layer superimposed over a portion of the ground glass, allowing for consecutive measurements using the RII and CRII techniques.

TABLE 1

STD of pixel values against a mirror

| Technique | 1 × 1 | 1 × 500 (Vertical) | 500 × 1 (Horizontal) |
|---|---|---|---|
| RII | 4.5683 | 4.7543 | 5.3606 |
| CRII | 21.3348 | 18.8863 | 23.9906 |

TABLE 2

STD of pixel values against a leaf at a depth of 6 μm

| Technique | 1 × 1 | 1 × 500 (Vertical) | 500 × 1 (Horizontal) |
|---|---|---|---|
| RII | 1.0943 | 1.0864 | 1.4557 |
| CRII | 2.0015 | 2.7275 | 3.5754 |

The results shown in Tables 1 and 2 show that the CRII technique can produce a higher contrast both at the surface and at depth compared to a single frequency illumination pattern used in RII. Because of a 2-3 times greater contrast at depth, sectioning of an image can be performed without a significant number of additional image frames captured.

Figure 7B:
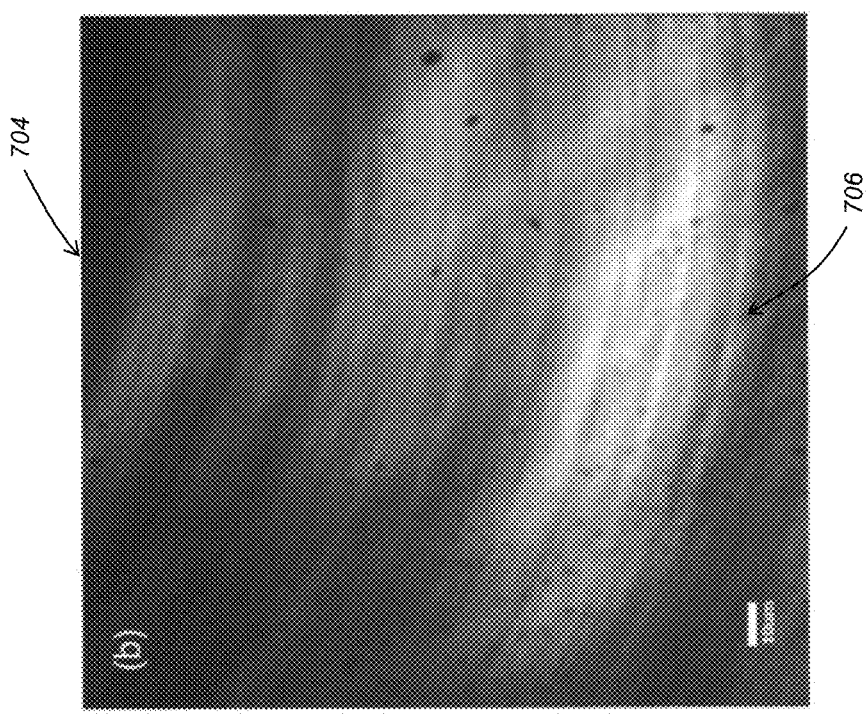
FIG. 7B is an example image with reduced streaking produced by a cascaded random intensity illumination imaging process.

In some embodiments, the multiple diffuser technique of CRII also has the added benefit of reducing the amount of streaking that can be created in an image. As the diffuser is rotated on a fixed axis, such as axis 148, areas where the diffusion patterns have slightly greater correlation create local maxima in $I_r$ and areas with no minimum create a local minimum in $I_r$. As shown in FIG. 7A, the result of these two effects can be parallel lines 702, or streaks, within an image 700 produced with a RII technique. As shown in FIG. 7B, the use of a CRII technique to produce an image 704 of the same target object significantly minimizes the presence of streaking 706 compared to the streaking 702 in image 700 of FIG. 7A. In both images, the same number of 40 image frames samples and light source intensities values were utilized. In comparing images 700 and 704, the comparison shows that the addition of a separate decorrelated diffusion pattern having distinct set of spatial frequencies that is can be used to eliminate many of the streaking artifacts resulting from possible radial correlation of diffusion patterns.

Figure 8:
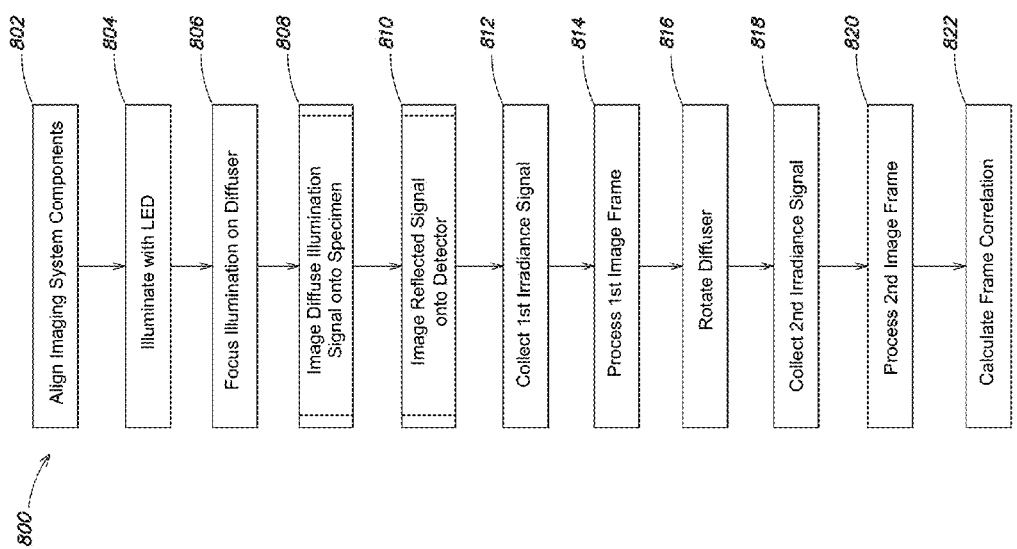
FIG. 8 is a workflow diagram of the steps taken in calibrating the optical imaging system for use in either random intensity illumination or cascaded random intensity illumination.

In some embodiments, the initial setup, configuration and calibration of a RII or CRII optical microscopy apparatus include a number of steps to be performed in sequence. One such example method for setup, configuration and calibration is presented in FIG. 8. The process 800 begins with alignment of all imaging components in act 802. Alignment of components includes arranging all elements of system 100 or 200 shown in FIG. 1 or FIG. 2 including the sample object specimen 126 that is to be imaged. In act 804, an incoherent light source, such as an LED source 102, provides illumination of an incoherent optical signal 104 to the optical microscopy system. In act 806, the incoherent light signal is focused by a focusing lens 106 on a diffuser such as diffuser 110 (FIG. 1) or composite diffuser 206 (FIG. 2). In act 808, the incoherent light signal that has been modulated by the diffuser is imaged onto a specimen. Act 808 can comprise multiple sub-steps when imaging the diffuser onto the specimen, and one example embodiment of these steps is described below with reference to FIG. 9. After imaging of the diffusion pattern onto the specimen (act 808), in act 810 the incoherent light signal that has been modulated by the diffusion pattern is reflected from the specimen, and a reflected incoherent light signal that has been modulated by both the diffusion pattern and the sample object specimen is imaged onto an image capture device. Act 808 can comprise multiple sub-steps when imaging the specimen onto the image capture device, and one example of these steps is described below with reference to FIG. 10.

In act 812, a first irradiance signal is captured by the image capture device. The image capture device can either communicate the captured irradiance signal to a processor for further image processing, or can write the signal to a non-volatile computer readable medium that can later be accessed by the processor. In act 814, the processor can process the signal received from the image capture device to produce a first image frame. In act 816, the diffuser can be rotated by a set distance. In act 818, a second irradiance signal can be captured by the image capture device. And in act 820, as second image frame can be processed by the processor. In act 822, a correlation between the imposed diffusion patterns captured in the first and second image frames can be calculated. Process 800 can be repeated numerous times to determine the appropriate rotation settings of diffusers to provide for an appropriate decorrelation of speckle pattern between image frames for a particular set of diffusers and motor rotation speeds, as described previously above.

Figure 9:
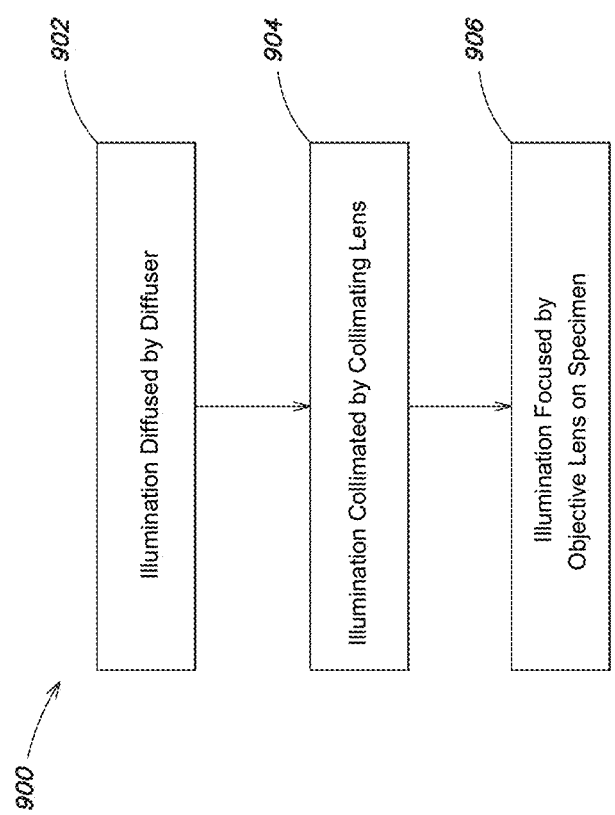
FIG. 9 is a workflow diagram of the substeps taken to image diffused illumination on to a specimen.

FIG. 9 illustrates an example process by which an incoherently illuminated diffusion pattern can be imaged onto a specimen. Process 900 includes act 902 where an incident incoherent light signal illumination 108 is diffused by a diffuser, such as diffuser 110 (FIG. 1) or composite diffuser 206 (FIG. 2). In act 904, the diverging optical signal 114 propagates to a collimating lens 116 where it is collimated in the direction of the sample object specimen 126. In act 906, the modulated and collimated first split signal 122 is focused by a microscope objective lens 124 on to the sample object specimen 126.

Figure 10:
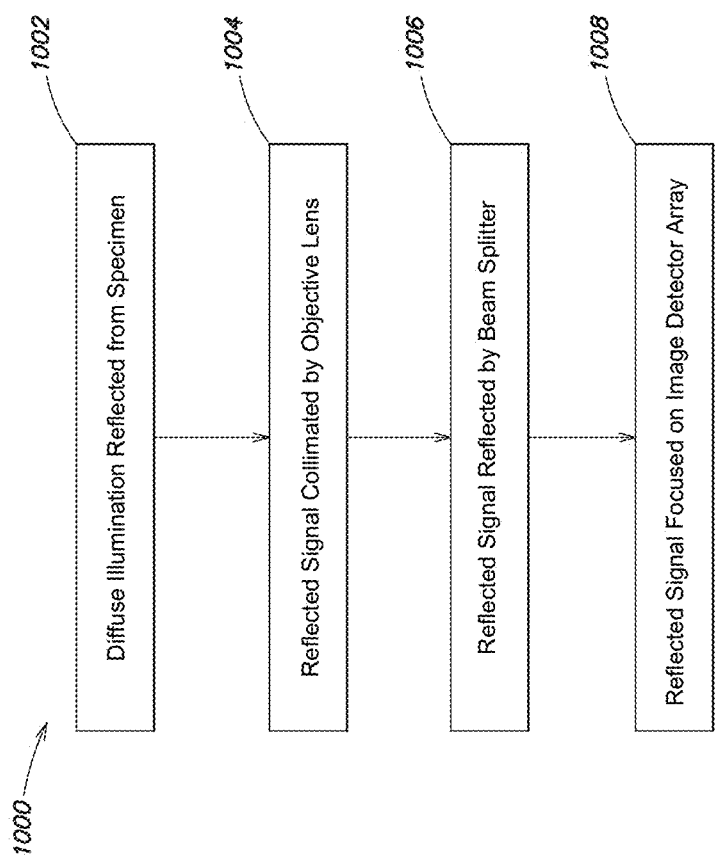
FIG. 10 is a workflow diagram of the substeps taken to image illumination reflected from a specimen on to a detector array.

FIG. 10 illustrates an example process by which reflected optical signal 128 that has been both modulated by the diffuser and reflected from a specimen can be imaged onto an image capture device. Process 1000 begins with act 1002 where the reflected optical signal 128 is reflected from the specimen. In act 1004, the modulated and reflected reflected optical signal 128 propagates to the microscope objective lens 124 where it is re-collimated in the direction of the beam splitter 120. In act 1006, the signal 130 is reflected by the beam splitter 120 in the direction of the image capture device 138. In act 1008, the incoherent modulated and redirected optical signal 132 is focused by a second focusing lens 134, and the optical signal 136 is directed onto the image capture device 138.

Figure 11:
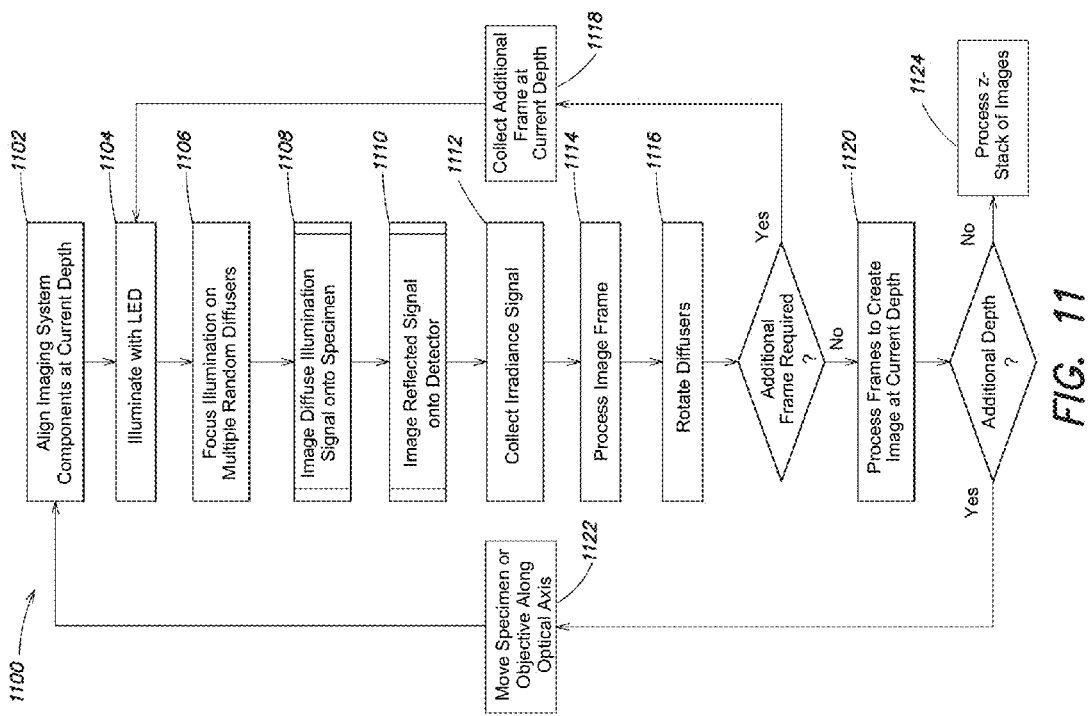
FIG. 11 is a workflow diagram of the steps taken to image a specimen over depth using random intensity illumination or cascaded random intensity illumination.

After calibration of a RII or CRII optical microscopy system such as by process 800 has been completed, operation of the system for imaging a specimen at multiple depths can be done. FIG. 11 illustrates one such operational procedure 1100 for imaging an object specimen at multiple depths with either a RII or CRII optical microscopy system. Process 1100 begins with act 1102 wherein all components of the optical microscopy system are aligned for a specimen at its current depth. As described in reference to step 802 of process 800, aligning all components of the system can include aligning the specimen as well as the other optical components. In act 1104, the optical microscopy system can be illuminated by an incoherent light source, such as an LED source 102. In act 1106, the incoherent optical signal 104 produced by the LED source 102 can propagate to a focusing lens 106, where the focused incoherent optical signal 108 can be focused on one or more random diffusers such as diffuser 110 (FIG. 1) or composite diffuser 206 (FIG. 2), depending on whether the system is a RII (FIG. 1) or CRII (FIG. 2) optical microscopy system. In act 1108, the diverging optical signal 114 that has been modulated by the one or more diffusers can be imaged on to the sample object specimen 126. In some embodiments, the process of imaging the incoherent, diffuser-modulated, diverging optical signal 114 onto the specimen can be performed by a process such as process 900 described previously in reference to FIG. 9.

In act 1110, the incoherent, diffusion-modulated, reflected optical signal 128 that has been reflected from the sample object specimen 126 can be imaged on to an image capture device 138. In various embodiments, the process of imaging the signal reflected from the specimen can be performed by a process such as process 1000 described previously in reference to FIG. 10. In act 1112, an irradiance signal can be collected by the image capture device 138. In some embodiments, the irradiance signal captured by the image capture device can be either communicated to a computer processor 140 for further image processing, or can be written to a non-volatile computer readable medium that can later be accessed by the processor. In act 1114, the processor can process the signal received from the image capture device to produce a first image frame. In act 1116, the diffuser such as diffuser 110 (FIG. 1) or composite diffuser 206 (FIG. 2) can be rotated by a set distance.

Next, based on configuration of the optical microscopy system, and the quality of the currently captured image frame, a decision can be made by the process and apparatus or by an operator of the apparatus as to whether an additional image frame is to be captured to produce an image of sufficient quality. In some embodiments, if an additional image frame is to be captured, then the process can proceed to act 1118 where instructions are provided to capture the additional image frame. The system is then returned to act 1104, and is configured to repeat steps 1104 to 1116. In various embodiments, if additional frames are not to be captured at the current depth of the specimen, then the system can proceed to act 1120 wherein all frames at a particular depth can be processed by the processor to produce an image at the current depth. It is to be appreciated that, this image can be a composite of irradiance measurements from all frames or a subset of frames captured at the current specimen depth.

Subsequently, based on the configuration settings of the system, a decision can be made as to whether images of the specimen at different depth are desired. In some embodiments, if images of the specimen at a different depth are desired, the process can advance to act 1122, wherein either the sample object specimen 126 or the microscope objective lens 124 are moved by associated motors 144, 152 to a new location. Upon moving either the specimen or the objective lens, the process can be returned to act 1102 and steps 1102 to 1120 can be repeated at the new depth. In some embodiments, if an image of the specimen at an additional depth is not to be done, then the process can proceed to act 1124, wherein the processor can process all images in the z-stack of depth images that have been created of the current specimen.

Figure 12:
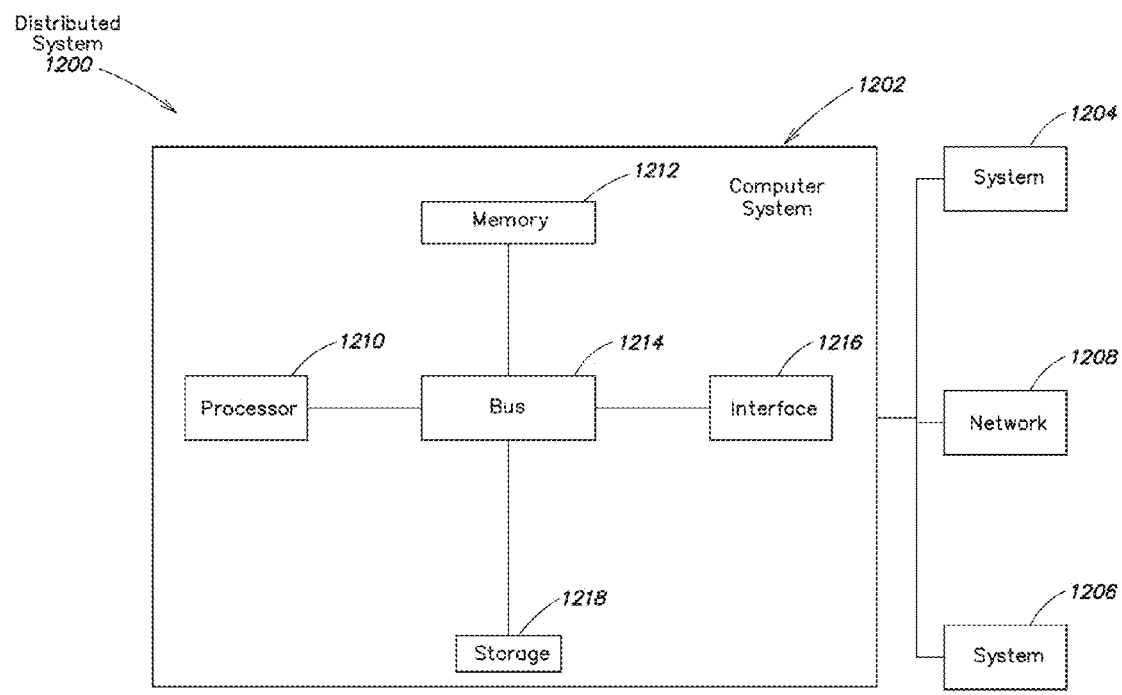
FIG. 12 illustrates an example computer system upon which various aspects in accord with the present invention may be implemented.

In some embodiments, when capturing an image of the specimen using an image capture device, such as image capture device 138, the signals representing the image can be communicated by either electronic or photonic methods to either a processor or non-volatile computer readable medium, such as the computer 140 in FIG. 1 and FIG. 2. FIG. 12 describes one such computer as the distributed system 1200.

Referring to FIG. 12, there is illustrated a block diagram of a distributed computer system 1200, in which various aspects and functions are practiced. As shown, the distributed computer system 1200 includes one more computer systems that exchange information. More specifically, the distributed computer system 1200 includes computer systems 1202, 1204 and 1206. As shown, the computer systems 1202, 1204 and 1206 are interconnected by, and may exchange data through, a communication network 1208. The network 1208 may include any communication network through which computer systems may exchange data. To exchange data using the network 1208, the computer systems 1202, 1204 and 1206 and the network 1208 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 1202, 1204 and 1206 may transmit data via the network 1208 using a variety of security measures including, for example, TLS, SSL or VPN. While the distributed computer system 1200 illustrates three networked computer systems, the distributed computer system 1200 is not so limited and may include any number of computer systems and computing devices, networked using any medium and communication protocol.

As illustrated in FIG. 12, the computer system 1202 includes a processor 1210, a memory 1212, a bus 1214, an interface 1216 and data storage 1218. To implement at least some of the aspects, functions and processes disclosed herein, the processor 1210 performs a series of instructions that result in manipulated data. The processor 1210 may be any type of processor, multiprocessor or controller. Some exemplary processors include commercially available processors such as an Intel Xeon, Itanium, Core, Celeron, or Pentium processor, an AMD Opteron processor, a Sun UltraSPARC or IBM Power5+ processor and an IBM mainframe chip. The processor 1210 is connected to other system components, including one or more memory devices 1212, by the bus 1214. The memory 1212 stores programs and data during operation of the computer system 1202. Thus, the memory 1212 may be a relatively high performance, volatile, random access memory such as a dynamic random access memory (DRAM) or static memory (SRAM). However, the memory 1212 may include any device for storing data, such as a disk drive or other nonvolatile storage device. Various examples may organize the memory 1212 into particularized and, in some cases, unique structures to perform the functions disclosed herein. These data structures may be sized and organized to store values for particular data and types of data.

Components of the computer system 1202 are coupled by an interconnection element such as the bus 1214. The bus 1214 may include one or more physical busses, for example, busses between components that are integrated within a same machine, but may include any communication coupling between system elements including specialized or standard computing bus technologies such as IDE, SCSI, PCI and InfiniBand. The bus 1214 enables communications, such as data and instructions, to be exchanged between system components of the computer system 1202.

The computer system 1202 also includes one or more interface devices 1216 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 1202 to exchange information and to communicate with external entities, such as users and other systems.

The data storage 1218 includes a computer readable and writeable nonvolatile, or nontransitory, data storage medium in which instructions are stored that define a program or other object that is executed by the processor 1210. The data storage 1218 also may include information that is recorded, on or in, the medium, and that is processed by the processor 1210 during execution of the program. More specifically, the information may be stored in one or more data structures specifically configured to conserve storage space or increase data exchange performance. The instructions may be persistently stored as encoded signals, and the instructions may cause the processor 1210 to perform any of the functions described herein. The medium may, for example, be optical disk, magnetic disk or flash memory, among others. In operation, the processor 1210 or some other controller causes data to be read from the nonvolatile recording medium into another memory, such as the memory 1212, that allows for faster access to the information by the processor 1210 than does the storage medium included in the data storage 1218. The memory may be located in the data storage 1218 or in the memory 1212, however, the processor 1210 manipulates the data within the memory, and then copies the data to the storage medium associated with the data storage 1218 after processing is completed. A variety of components may manage data movement between the storage medium and other memory elements and examples are not limited to particular data management components. Further, examples are not limited to a particular memory system or data storage system.

Although the computer system 1202 is shown by way of example as one type of computer system upon which various aspects and functions may be practiced, aspects and functions are not limited to being implemented on the computer system 1202 as shown in FIG. 12. Various aspects and functions may be practiced on one or more computers having a different architectures or components than that shown in FIG. 12. For instance, the computer system 1202 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 1202 may be a computer system including an operating system that manages at least a portion of the hardware elements included in the computer system 1202. In some examples, a processor or controller, such as the processor 1210, executes an operating system. Examples of a particular operating system that may be executed include a Windows-based operating system, such as, Windows NT, Windows 2000 (Windows ME), Windows XP, Windows Vista, Windows 7 or Windows 8 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Oracle Corporation, or a UNIX operating systems available from various sources. Many other operating systems may be used, and examples are not limited to any particular operating system.

The processor 1210 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used.

Alternatively, functional, scripting, or logical programming languages may be used. Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g. specialized hardware, executable code, data structures or objects that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems.

Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An optical imaging system comprising:
   an incoherent light source configured to provide an incoherent optical signal;
   at least two diffusers having distinct sets of primary spatial frequency compositions and configured to modulate the incoherent optical signal with a spatially random pattern as the incoherent optical signal propagates through the at least two diffusers to provide a diffused spatially random incoherent optical signal, the at least two diffusers being further configured to rotate about an axis parallel to a primary optical axis of the optical imaging system to avoid correlation between successive image frames of the diffused spatially random incoherent optical signal;
   a first focusing lens positioned along the primary optical axis between the incoherent light source and the at least two diffusers, the first focusing lens being configured to focus the incoherent optical signal onto the at least two diffusers;

a collimating lens positioned along the primary optical axis and configured to receive and collimate the diffused spatially random incoherent optical signal;

a beam splitter configured to receive the diffused spatially random incoherent optical signal from the collimating lens and to direct a first optical signal toward a sample object, the first optical signal corresponding to at least a portion of the diffused spatially random incoherent optical signal;

an objective lens configured to receive the first optical signal from the beams splitter, to focus the first optical signal onto the sample object, to receive and collimate a reflected signal from the sample object, and to direct the reflected signal to the beam splitter, the reflected signal corresponding to at least a portion of the first optical signal including an image of the sample object superimposed thereon;

an image capture device configured to receive the the reflected signal, the beam splitter being further configured to direct the reflected signal to the image capture device; and a processor coupled to the image capture device and configured to perform digital image processing on the reflected signal to obtain the image of the sample object.

2. The optical imaging system of claim 1, wherein the incoherent light source is a light emitting diode.

3. The optical imaging system of claim 1, wherein the at least two diffusers are configured to maintain a fixed mutual orientation when rotated azimuthally about the axis.

4. The optical imaging system of claim 1, wherein the each of the at least two diffusers comprises ground glass.

5. The optical imaging system of claim 1, wherein the processor is further configured to determine a contrast in irradiance between the successive image frames.

6. The optical imaging system of claim 1, further comprising a second focusing lens positioned between the beam splitter and the image capture device and configured to focus the reflected signal onto the image capture device.

7. The optical imaging system of claim 1, wherein the beam splitter is configured to transmit at least the portion of the diffused spatially random incoherent optical signal to direct the first optical signal toward the sample object, and to reflect the reflected signal toward the image capture device.

8. The optical imaging system of claim 1, wherein the at least two diffusers each comprise a diffusion paper.

9. The optical imaging system of claim 1, wherein the at least two diffusers each comprise a pressure sensitive tape.

10. The optical imaging system of claim 1, wherein the at least two diffusers are physically separated from one another.

11. The optical imaging system of claim 1, wherein the at least two diffusers are physically connected to one another.

12. The optical imaging system of claim 1, wherein the image capture device includes one of a charge coupled device (CCD) array and a complementary metal oxide semiconductor (CMOS) array.

13. The optical imaging system of claim 1 wherein the beam splitter includes a pair of triangular glass prisms joined together with an adhesive.

14. The optical imaging system of claim 1, wherein the beam splitter is a dichroic beam splitter.

15. A method of optically imaging a specimen with an imaging system, the method comprising acts of:

providing an incoherent optical signal with an incoherent light source;

diffusing the incoherent optical signal with at least two diffusers having spatially random diffusion patterns with distinct sets of primary spatial frequency compositions to provide a diffused spatially random incoherent optical signal;

collimating the diffused spatially random incoherent optical signal with a collimating lens;

directing the diffused spatially random incoherent optical signal from the collimating lens toward a specimen using a beam splitter;

reflecting the diffused spatially random incoherent optical signal from the specimen to provide a reflected light signal;

reflecting from the beam splitter the reflected light signal;

collecting the reflected light signal with an image capture device and processing the reflected light signal to provide an image of the specimen;

rotating the at least two diffusers about an axis parallel to a primary optical axis of the imaging system to avoid correlation between successive image frames of the image of the specimen.

16. The method of claim 15, further comprising calculating with a processor a contrast in irradiance between the successive image frames.

17. The method of claim 15, further comprising moving the specimen along the primary optical axis of the imaging system between capture of the successive image frames of the image of the specimen.

18. The method of claim 15, further comprising focusing the diffused spatially random incoherent optical signal onto the specimen using an objective lens.

19. The method of claim 18, further comprising moving the objective lens along the primary optical axis of the imaging system between capture of the successive image frames of the image of the specimen.

20. The method of claim 15 further comprising focusing the incoherent optical signal onto the at least two diffusers using a focusing lens positioned between the incoherent light source and the at least two diffusers.

* * * * *